(12) United States Patent
Cha et al.

(10) Patent No.: US 11,892,553 B2
(45) Date of Patent: Feb. 6, 2024

(54) USING ANGLE ERROR GROUP (AEG) TO IMPROVE ANGLE OF ARRIVAL (AOA) POSITIONING

(71) Applicant: NOKIA TECHNOLOGIES OY, Espoo (FI)

(72) Inventors: Hyun-Su Cha, Oak Park, IL (US); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 147 days.

(21) Appl. No.: 17/342,286

(22) Filed: Jun. 8, 2021

(65) Prior Publication Data
US 2022/0390546 A1    Dec. 8, 2022

(51) Int. Cl.
*G01S 5/02* (2010.01)
*G01S 5/04* (2006.01)
*H04W 88/08* (2009.01)
*G01S 5/06* (2006.01)
*G01S 3/46* (2006.01)

(52) U.S. Cl.
CPC ................... *G01S 5/04* (2013.01); *G01S 3/46* (2013.01); *G01S 5/06* (2013.01); *H04W 88/08* (2013.01)

(58) Field of Classification Search
CPC ..... G01S 5/04; G01S 5/06; G01S 3/46; G01S 3/465; G01S 3/48; G01S 3/50
USPC .................................................. 342/417, 451
See application file for complete search history.

(56) References Cited

U.S. PATENT DOCUMENTS

| | | | |
|---|---|---|---|
| 6,239,747 B1* | 5/2001 | Kaminski | G01S 3/023 342/368 |
| 10,523,288 B2* | 12/2019 | Tomioka | H04B 7/0634 |
| 10,732,253 B2* | 8/2020 | Smith | H01Q 21/065 |
| 10,942,249 B2* | 3/2021 | Ding | G01S 5/0231 |
| 11,513,182 B2* | 11/2022 | Sheng | H04W 64/00 |
| 2002/0027526 A1 | 3/2002 | Kohno et al. | |
| 2015/0192656 A1* | 7/2015 | Werner | G01S 3/46 342/442 |

(Continued)

FOREIGN PATENT DOCUMENTS

WO    WO-2020164637 A1 *    8/2020    ............ H04W 24/10

OTHER PUBLICATIONS

International Search Report and Written Opinion dated Aug. 31, 2022, corresponding to International Application No. PCT/FI2022/050321.

(Continued)

*Primary Examiner* — Chuong P Nguyen
(74) *Attorney, Agent, or Firm* — SQUIRE PATTON BOGGS (US) LLP

(57) ABSTRACT

Systems, methods, apparatuses, and computer program products for using angle error groups (AEGs) to improve angle of arrival (AoA) positioning may be provided. For example, for a specific received signal, one or more receiving antenna elements that can be considered to have almost the same incident angle within a certain margin may be defined as a group. The group of receive (Rx) antenna elements (or a group of Rx antennas) may be defined as an AEG. The configuration of an AEG for each TRP and the AEG may be used for AoA measurement and reporting. The gNB or transmit receive point (TRP) may perform AoA measurements and may determine an AoA for the AEGs.

23 Claims, 7 Drawing Sheets

(56) References Cited

U.S. PATENT DOCUMENTS

| | | | | |
|---|---|---|---|---|
| 2016/0334498 | A1* | 11/2016 | Jamieson | G01S 5/02213 |
| 2018/0076875 | A1 | 3/2018 | Haverinen et al. | |
| 2018/0337739 | A1 | 11/2018 | Petersson et al. | |
| 2020/0142025 | A1* | 5/2020 | Irvine | H01Q 3/36 |
| 2021/0096207 | A1* | 4/2021 | Torrini | G06N 3/045 |
| 2021/0303746 | A1* | 9/2021 | Cavacuiti | H04W 4/80 |
| 2021/0385623 | A1* | 12/2021 | Wang | H04W 4/025 |
| 2022/0271826 | A1* | 8/2022 | Ray | H04B 7/0837 |

OTHER PUBLICATIONS

Intel Corporation et al., "New WID: NR Positioning Support," 3GPP, RP-190752, 3GPP TSG RAN Meeting #83, Shenzhen, China, Mar. 18-21, 2019.

Intel Corporation et al., "Revised WID on NR Positioning Enhancements," 3GPP, RP-210897, 3GPP TSG RAN Meeting #91e, Electronic Meeting, Mar. 26, 2021.

Qualcomm Incorporated, "Enhancements on Timing Error Mitigations for improved Accuracy," 3GPP, R1-2103170, 3GPP TSG RAN WG1 #104b-e, e-Meeting, Apr. 12-20, 2021.

Nokia et al., "Views on mitigating UE and gNB Rx/Tx timing errors," 3GPP, R1-2103002, 3GPP TSG RAN WG1 #104-bis-e, Apr. 6, 2021.

3GPP TS 38.455 V16.3.0 (Apr. 2021), Technical Specification, 3rd Generation Partnership Project; Technical Specification Group Radio Access Network; NG-RAN; NR Positioning Protocol A (NRPPa) (Release 16), Apr. 2021.

3GPP TS 37.355 V16.4.0 (Mar. 2021), Technical Specification, 3rd Generation Partnership Project; Technical Specification Group Radio Access Network; LTE Positioning Protocol (LPP) (Release 16), Mar. 2021.

Dr. Benoit Derat et al., "5G Focuses on OTA," Wireless, Published by Rohde & Schwarz, Aug. 2019, pp. 8-13.

3GPP, "RAN1 Chairman's Notes," 3GPP TSG RAN WG1 Meeting #104-e, e-Meeting, Jan. 25-Feb. 5, 2021.

Keke Hu et al., "Near-Field Source Localization: Sparse Recovery Techniques and Grid Matching," IEEE 8th Sensor Array and Multichannel Signal Processing Workshop (SAM), pp. 369-372, 2014.

* cited by examiner

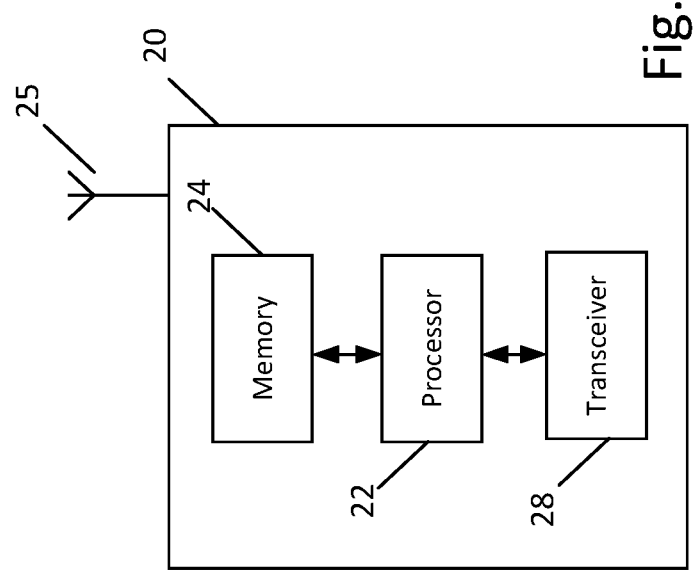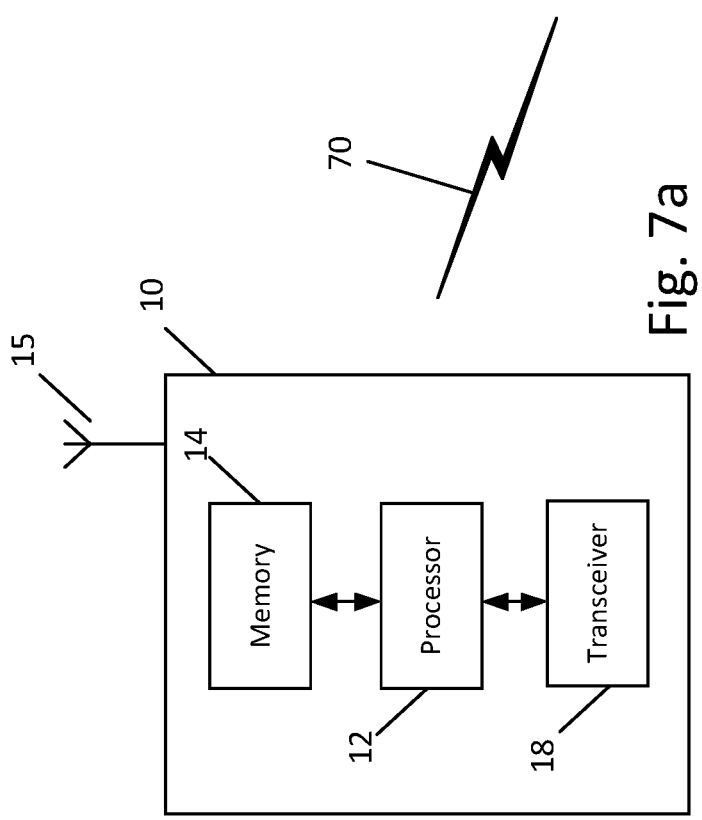

USING ANGLE ERROR GROUP (AEG) TO IMPROVE ANGLE OF ARRIVAL (AOA) POSITIONING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for using angle error group (AEG) to improve angle of arrival (AoA) positioning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus at least to transmit, to a node, information related to two or more angle error groups. The two or more angle error groups may include one or more antenna elements and the information may include identifiers for the two or more angle error groups. The at least one memory and the computer program code may be configured to, with the at least one processor, cause the apparatus at least to perform one or more angle of arrival measurements based on signals received at at least one angle error group of the two or more angle error groups. The at least one memory and the computer program code may be configured to, with the at least one processor, cause the apparatus at least to determine, based on the one or more angle of arrival measurements, an angle of arrival for the at least one angle error group. The at least one memory and the computer program code may be configured to, with the at least one processor, cause the apparatus at least to transmit, to the node, the determined angle of arrival and an identifier for the at least one angle error group associated with the determined angle of arrival.

In a variant, the one or more angle of arrival measurements may include one or more horizontal angle of arrival measurements, or one or more vertical angle of arrival measurements. In a variant, the at least one memory and the computer program code may be configured to, with the at least one processor, further cause the apparatus, when transmitting the determined angle of arrival and the identifier for the at least one angle error group, at least to transmit the determined angle of arrival and the identifier for the at least one angle error group to at least one of a location server, a location management function node, or a user equipment. In a variant, the at least one memory and the computer program code may be configured to, with the at least one processor, further cause the apparatus at least to transmit, in connection with transmitting the determined angle of arrival and the identifier for the at least one angle error group, at least one of: an identifier for a user equipment, a sounding reference signal resource identifier, multiple sounding reference signal resources identifiers, a sounding reference signal resource set identifier, an uplink random access channel preamble identifier, antenna panel information for the user equipment, or side-link reference signals.

In a variant, the at least one memory and the computer program code may be configured to, with the at least one processor, further cause the apparatus at least to receive a request for an indication of a capability of the apparatus related to determining angle error groups or angle of arrival positioning, and transmit the indication. In a variant, the at least one memory and the computer program code may be configured to, with the at least one processor, further cause the apparatus at least to receive an indication to report the determined angle of arrival for the at least one angle error group. In a variant, the at least one memory and the computer program code may be configured to, with the at least one processor, further cause the apparatus, when transmitting the determined angle of arrival and the identifier for the at least one angle error group, at least to transmit the determined angle of arrival for the at least one angle error group and the identifier for the at least one angle error group based on the received indication.

In a variant, the at least one memory and the computer program code may be configured to, with the at least one processor, further cause the apparatus at least to receive an error margin related to the one or more angle of arrival measurements, and select the at least one angle error group based on the error margin. In a variant, the apparatus may include at least one of a next generation node B, a transmit receive point, or a user equipment.

According to a second embodiment, an apparatus may include at least one processor and at least one memory including computer program code. The at least one memory and the computer program code may be configured to, with the at least one processor, cause the apparatus at least to receive, from a node, information related to two or more angle error groups. The two or more angle error groups may include one or more antenna elements and the information may include identifiers for the two or more angle error groups. The at least one memory and the computer program code may be configured to, with the at least one processor, cause the apparatus at least to receive a determined angle of arrival related to signals received at at least one angle error group of the two or more angle error groups and an identifier for the at least one angle error group associated with the determined angle of arrival.

In a variant, the determined angle of arrival may be based on one or more angle of arrival measurements including one or more horizontal angle of arrival measurements or one or more vertical angle of arrival measurements. In a variant, the node may include at least one of a next generation node B, a transmit receive point, or a user equipment. In a variant, the at least one memory and the computer program code may be configured to, with the at least one processor, further cause the apparatus at least to receive, in connection with receiving the determined angle of arrival and the identifier for the at least one angle error group, at least one of: an identifier for a user equipment, a sounding reference signal resource identifier, multiple sounding reference signal resources identifiers, a sounding reference signal resource set identifier, an uplink random access channel preamble identifier, antenna panel information for the user equipment, or side-link reference signals.

In a variant, the at least one memory and the computer program code may be configured to, with the at least one processor, further cause the apparatus at least to transmit a request for an indication of a capability of the node related to determining angle error groups or angle of arrival positioning, and receive the indication. In a variant, the at least one memory and the computer program code may be configured to, with the at least one processor, further cause the apparatus at least to transmit an indication to report the determined angle of arrival for the at least one angle error group. In a variant, the at least one memory and the computer program code may be configured to, with the at least one processor, further cause the apparatus, when receiving the determined angle of arrival and the identifier for the at least one angle error group, at least to receive the determined angle of arrival for the at least one angle error group and the identifier for the at least one angle error group based on the transmitted indication.

In a variant, the at least one memory and the computer program code may be configured to, with the at least one processor, further cause the apparatus at least to transmit an error margin related to the one or more angle of arrival measurements. In a variant, the apparatus may include at least one of a location server, a location management function node, or a user equipment. In a variant, the at least one memory and the computer program code may be configured to, with the at least one processor, further cause the apparatus at least to estimate a location of a user equipment based on the determined angle of arrival and the identifier for the at least one angle error group.

According to a third embodiment, a method may include transmitting, by a node to another node, information related to two or more angle error groups. The two or more angle error groups may include one or more antenna elements and the information may include identifiers for the two or more angle error groups. The method may further include performing one or more angle of arrival measurements based on signals received at at least one angle error group of the two or more angle error groups. The method may further include determining, based on the one or more angle of arrival measurements, an angle of arrival for the at least one angle error group. The method may further include transmitting, to the other node, the determined angle of arrival and an identifier for the at least one angle error group associated with the determined angle of arrival.

In a variant, the one or more angle of arrival measurements may include one or more horizontal angle of arrival measurements, or one or more vertical angle of arrival measurements. In a variant, the transmitting the determined angle of arrival and the identifier for the at least one angle error group may further include transmitting the determined angle of arrival and the identifier for the at least one angle error group to at least one of a location server, a location management function node, or a user equipment. In a variant, the method may further include transmitting, in connection with transmitting the determined angle of arrival and the identifier for the at least one angle error group, at least one of: an identifier for a user equipment, a sounding reference signal resource identifier, multiple sounding reference signal resources identifiers, a sounding reference signal resource set identifier, an uplink random access channel preamble identifier, antenna panel information for the user equipment, or side-link reference signals.

In a variant, the method may further include receiving a request for an indication of a capability of the node related to determining angle error groups or angle of arrival positioning, and transmitting the indication. In a variant, the method may further include receiving an indication to report the determined angle of arrival for the at least one angle error group. In a variant, the transmitting the determined angle of arrival and the identifier for the at least one angle error group may further include transmitting the determined angle of arrival for the at least one angle error group and the identifier for the at least one angle error group based on the received indication.

In a variant, the method may further include receiving an error margin related to the one or more angle of arrival measurements, and selecting the at least one angle error group based on the error margin. In a variant, the node may include at least one of a next generation node B, a transmit receive point, or a user equipment.

According to a fourth embodiment, a method may include receiving, by a node from another node, information related to two or more angle error groups. The two or more angle error groups may include one or more antenna elements and the information may include identifiers for the two or more angle error groups. The method may include receiving a determined angle of arrival related to signals received at at least one angle error group of the two or more angle error groups and an identifier for the at least one angle error group associated with the determined angle of arrival.

In a variant, the determined angle of arrival may be based on one or more angle of arrival measurements including one or more horizontal angle of arrival measurements or one or more vertical angle of arrival measurements. In a variant, the other node may include at least one of a next generation node B, a transmit receive point, or a user equipment. In a variant, the method may further include receiving, in connection with receiving the determined angle of arrival and the identifier for the at least one angle error group, at least one of: an identifier for a user equipment, a sounding reference signal resource identifier, multiple sounding reference signal resources identifiers, a sounding reference signal resource set identifier, an uplink random access channel preamble identifier, antenna panel information for the user equipment, or side-link reference signals.

In a variant, the method may further include transmitting a request for an indication of a capability of the other node related to determining angle error groups or angle of arrival positioning, and receiving the indication. In a variant, the method may further include transmitting an indication to report the determined angle of arrival for the at least one angle error group. In a variant, the receiving the determined angle of arrival and the identifier for the at least one angle error group may further include receiving the determined angle of arrival for the at least one angle error group and the identifier for the at least one angle error group based on the transmitted indication.

In a variant, the method may further include transmitting an error margin related to the one or more angle of arrival measurements. In a variant, the node may include at least one of a location server, a location management function node, or a user equipment. In a variant, the method may further include estimating a location of a user equipment based on the determined angle of arrival and the identifier for the at least one angle error group.

A fifth embodiment may be directed to an apparatus that may include circuitry configured to cause the apparatus to perform the method according to the third embodiment or the fourth embodiment, or any of the variants discussed above.

A sixth embodiment may be directed to an apparatus that may include means for performing the method according to the third embodiment or the fourth embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants discussed above.

An eighth embodiment may be directed to a computer program product (or a computer readable medium) encoding instructions for causing an apparatus to perform at least the method according to the third embodiment or the fourth embodiment, or any of the variants discussed above.

BRIEF DESCRIPTION OF THE DRAWINGS

For proper understanding of example embodiments, reference should be made to the accompanying drawings, wherein:

FIG. 7a illustrates an example block diagram of an apparatus, according to an embodiment; and FIG. 7b illustrates an example block diagram of an apparatus, according to another embodiment.

DETAILED DESCRIPTION

Figure 1:
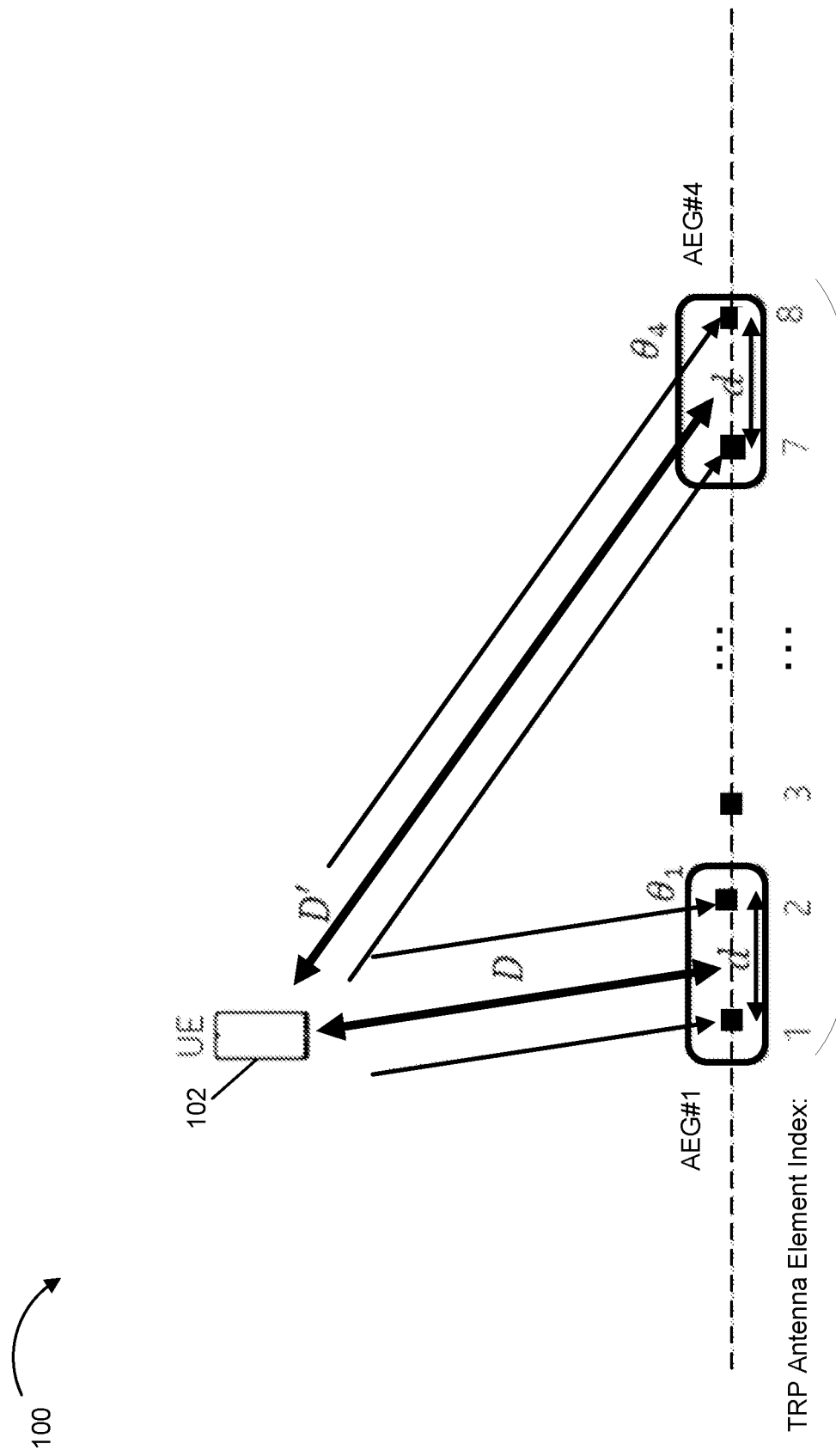
FIG. 1 illustrates an example of an AEG, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for using AEG to improve AoA positioning is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Aspects of NR may relate to positioning. For instance, NR may provide support for the following positioning techniques: downlink time difference of arrival (DL-TDOA), uplink time difference of arrival (UL-TDOA), downlink angle of departure (DL-AoD), uplink angle of arrival (UL-AoA), and multi-cell round trip time (multi-RTT). Certain objectives related to NR may focus on procedure, measurements, reporting and signaling for improving the accuracy of UL-AoA for network-based positioning solutions. As such, there may be a need for performance enhancements for the AoA positioning.

According to aspects of NR, each TRP may be able to report multiple AoA values. For example, in order to support reporting of multiple values, more than one UL-AoA measurement value associated with the first arrival path and corresponding timestamps may have to be reported to a location management function (LMF). In addition, NR may support reporting of more than one UL-AoA measurement value by a gNB to the LMF at least for the first arrival path.

Location estimation accuracy may degrade according to the inherent timing error (e.g., group delay) according to device characteristic. For example, different transmission or reception antenna panels at the UE or gNB may have different timing errors while the same transmission or reception antenna panel at the UE or gNB may have the same or similar timing error. A time error group (TEG) may be defined as follows: UE transmit (Tx) timing error group (UE Tx TEG) that may be associated with the transmissions of one or more UL sounding reference signal (SRS) resources for positioning purposes, which may have the Tx timing errors within a certain margin; TRP Tx timing error group (TRP Tx TEG) that may be associated with the transmissions of one or more DL positioning reference signal (PRS) resources, which may have the Tx timing errors within a certain margin; UE Rx timing error group (UE Rx TEG) that may be associated with one or more DL measurements, which may have the Rx timing errors within a certain margin; TRP Rx timing error group (TRP Rx TEG) that may be associated with one or more UL measurements, which may have the Rx timing errors within a margin; UE Rx-Tx timing error group (UE Rx-Tx TEG) that may be associated with one or more UE Rx-Tx time difference measurements, and one or more UL SRS resources for positioning purposes, which may have Rx timing errors and Tx timing errors within a certain margin; and TRP Rx-Tx timing error group (TRP Rx-Tx TEG) that may be associated with one or more gNB Rx-Tx time difference measurements and one or more DL PRS resources, which may have the Rx timing errors and Tx timing errors within a certain margin.

AoA positioning in NR may estimate the UE's location through angle of arrival measurements for received signal path(s). This type of positioning may focus on the presence of line-of-signal (LoS) signal path and/or how to utilize multiple signal path components. An AoA measurement may determine a direction of the propagated radio-frequency wave incident on an antenna element. This AoA may be measured by the path length difference at individual antenna elements of antenna arrays. The path length difference between antenna elements may be represented as phase difference. For example, a wireless signal might arrive at a linear antenna array which may have multiple antenna elements. The incident angle of the wireless signal may be represented by $\theta$, and the path length differences of the $2^{nd}$ and $3^{rd}$ antenna elements may be represented by $d \times \sin\theta$ and $2d \times \sin\theta$. In consideration of M antenna elements, the received signal model can be determined with a steering vector $a(\theta)$:

$$a(\theta) = \begin{bmatrix} 1 \\ e(-j\pi\sin\theta) \\ \dots \\ e(-j(M-1)\pi\sin\theta) \end{bmatrix}$$

Then AoA, denoted by $\theta$, can be estimated by using an estimation algorithm such as multiple signal classification (MUSIC) algorithm. However, it may just be valid for far-field scenarios such that the distance between a mobile device and TRP is far enough (e.g., greater than approximately 8 meters (m)). More strictly, the angle of arrival of each antenna element may not be the same, that is, the same AoA may be an assumption considering a far distant UE. Assuming that the UE is so close to the TRP, then the AoA of each antenna element may be completely different based on near-field assumption. However, a specific threshold to discriminate near-field and far-field (e.g., approximately 8 m) may not be clearly defined. Sometimes, the mixed case may need to be considered according to the distance between UE and gNB antenna. With improvements to NR, accuracy may be strict, such as at a sub-meter level. In NR, an error introduced by making the far-field assumption may be negligible compared with the targeted accuracy. As an example, the distance between a UE and a gNB may be several meters in a factory environment but the distance between the first and last antenna elements may be approximately 1 meter or more for some arrays at frequency range 1 (FR1). As can be understood from the above, there may be a need for improvements to AoA positioning.

Some embodiments described herein may provide for using AEG to improve AoA positioning. For example, for a specific received signal, one or more receiving antenna elements that can be considered to have almost the same incident angle within a certain margin may be defined as a group. The group of receive (Rx) antenna elements (or a group of Rx antennas) may be defined as an AEG. Certain embodiments may provide for the configuration of an AEG for each TRP and the AEG may be used for AoA measurement and reporting. The certain margin for angle error can be configured or provided by the network, such as by an LMF, and a device, such as a TRP or UE (e.g., a vehicle), can assign an identifier to each AEG to identify different AEGs. The gNB or TRP may perform AoA measurements and may determine an AoA for the AEGs. For example, a gNB or TRP may estimate a received angle of positioning sounding reference signal (SRS) resource(s). These measurements may be reported to a location server, which may estimate the UE's location. In this way, certain embodiments may provide performance enhancements for AoA positioning.

FIG. 1 illustrates an example 100 of an AEG, according to some embodiments. As illustrated in FIG. 1, the example 100 includes a UE 102 and a set of AEGs 104 (e.g., AEG #1 through AEG #4). Assume for the example 100 that there is just an LoS signal path between the UE 102 and a TRP and that the TRP is equipped with a single linear array antenna where the array antenna consists of multiple antenna elements. For a specific received signal path, the incident angle on a particular group of antenna elements can be nearly the same, but the incident angle on a different group of antenna elements could be the same or different depending on the distance between the elements. According to some embodiments, a gNB may include one or more TRPs, where each TRP may include a remote radio head (RRH). For example, within a physical cell, there may be a gNB and multiple TRPs, and an identifier of each TRP may be allocated by a location server.

In FIG. 1, D may represent the distance between the UE 102 and the first two antenna elements of the TRP, and D' may represent the distance between the UE 102 and the last two antenna elements, but D and D' could be the same or different. In this case, due to the distance between the UE 102 and the gNB, the following assumptions may be made for the example 100: D>>d: the planar wave assumption or far-field assumption is valid; D'>>d: the planar wave assumption or far-field assumption is valid; D>>7d: the planar wave assumption or far-field assumption is not valid; D'>>7d: the planar wave assumption or far-field assumption is not valid. For example, D may be significantly greater than d, but D may not be large enough to assume far-field compared to 7d. For the received signal from the perspective of the gNB, the TRP can determine that the signal as a planer wave for the first and the second antenna elements, and it can determine an incident angle ($\theta_1$) to these antenna elements, which may be equivalent within a certain margin. The TRP can determine that the signal is a planer wave for the seventh and the eighth antenna elements, and it can determine an incident angle ($\theta_4$) to these antenna elements which may be equivalent within a certain margin. The TRP may not determine that the signal as a planer wave for the first and the seventh (or eighth) antenna elements since the far-field assumption may not be true. The gNB may determine the first and second antenna elements as a single AEG, and the gNB may assign an independent identity for this AEG as AEG #1. Similarly, the gNB may determine the seventh and eighth antenna elements as another AEG, and it may assign another identity for this AEG as AEG #2.

Certain embodiments described herein may apply to various configurations of antennas, antenna elements and/or AEGs. For instance, as an example, there may be a single AEG where this AEG comprises 2 antennas at a TRP. This TRP may be equipped with 8 antennas in total, and there may be no other AEG such as AEG consists of 8 antennas. As second example, there may be multiple users which transmit UL signals to a TRP. In terms of each user, it may be possible that there is just one AEG for a TRP, but the AEG for different users can be different. Thus, effectively, in terms of TRP, there multiple AEGs. As a third example, a TRP may be equipped with a uniform linear array (ULA) which may comprise 8 antennas. There may be 2 AEGs where each AEG may include 4 antennas. However, the TRP can use both of AEGs and sometimes it may just use a single AEG for measurement reporting, depending on the measurement quality or accuracy requirement.

As described above, FIG. 1 is provided as an example. Other examples are possible, according to some embodiments.

Figure 2:
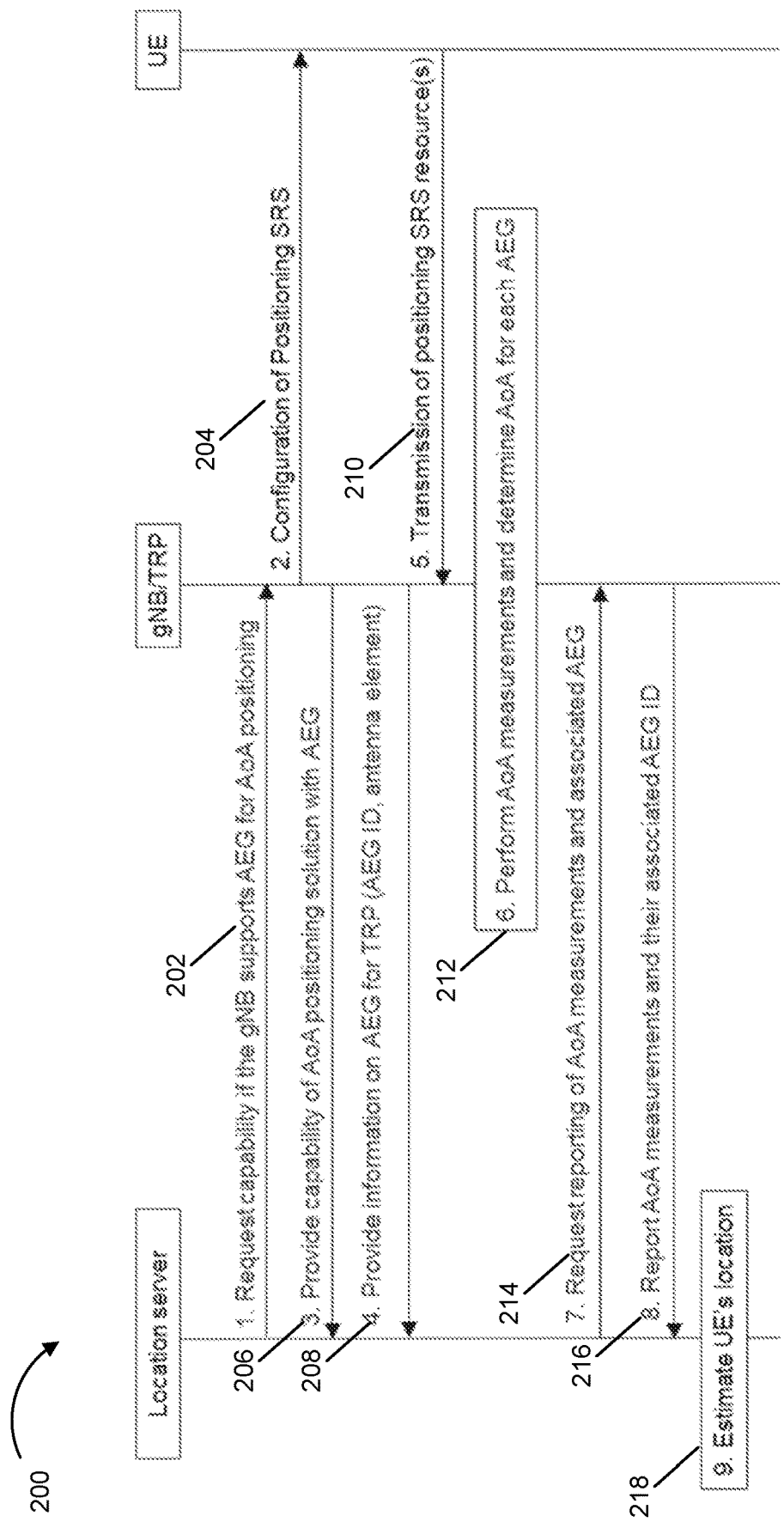
FIG. 2 illustrates an example signal diagram of using AEG to improve AoA positioning, according to some embodiments.

FIG. 2 illustrates an example signal diagram 200 of using an AEG to improve AOA positioning, according to some embodiments. As illustrated in FIG. 2, the example signal diagram 200 includes a location server (e.g., a LMF), a gNB or TRP, and a UE. In some embodiments, the operations of the gNB or TRP described herein may be performed by another UE (e.g., in a side-link deployment scenario).

As illustrated at 202, the location server may request, from the gNB or TRP, an indication of a capability if the gNB supports AEG for AoA positioning. For example, the location server may request the gNB to report its UL-AoA positioning capability. As illustrated at 204, the gNB or TRP may provide, to the UE, a configuration of positioning SRS. For example, the gNB may configure positioning SRS resource(s) to the target UE(s) and the gNB may provide the location server with the configured positioning SRS resources. As illustrated at 206, the gNB or the TRP may provide the indication of the capability of AoA positioning solution with AEG. For example, the gNB may report if it supports the measurement and report of AoA. Additionally, or alternatively, the gNB may report if it supports AEGs associated with a specific AoA measurement and report.

The gNB may determine, for each TRP, one or more AEGs. Additionally, or alternatively, the gNB may assign a unique identifier to each AEG which may be used to identify the corresponding AEG by the location server. Each AEG may include a single or multiple antenna elements. One or multiple AEGs can be determined for each UE or a group of UEs, where the group of UEs may be located in a similar region or location. An AEG can be assigned to a specific area or region. For example, an AEG can be associated with a specific cell portion identifier where the cell portion identifier indicates a specific region and/or area which may be assigned by the gNB or LMF. The identifier may include the cell portion identifier, and/or any other similar concept of identifier indicating a specific region. A single AEG can be mapped to a single reception antenna panel of a TRP.

As illustrated at 208, the gNB or the TRP may provide, to the location server, information on the AEG for the TRP. For example, the information may include the identifiers for the AEGs (AEG ID), information that identifies antennas or antenna elements in each AEG, and/or the like. Along with the above information, the gNB or TRP may provide the location server (or LMF) with the AEG information per TRP. For example, AEG information may include AEG identifier and antenna element information associated with the AEG identifiers. The antenna element(s) information may include a geometric location of the antenna elements mounted in a TRP antenna or a reference point of the AEG. As illustrated at 210, the UE may send, to the gNB or the TRP, a transmission of positioning SRS resources. As illustrated at 212, the gNB or the TRP may perform AoA measurements and may determine an AoA for each AEG. For example, the gNB or TRP may estimate angle measurements (AoAs) for the configured SRS resource(s) of the UE. The gNB or TRP may estimate AoA measurements per AEG per UE. If there are multiple signal paths, the AoA measurements may be per signal path.

As illustrated at 214, the location server may provide, to the gNB or TRP, a request for reporting of AoA measurements and associated AEGs. For example, the location server may request that the gNB report AoA measurements of a TRP. The request of the AoA measurement report may be associated with a specific AEG. As illustrated at 216, the gNB or the TRP may provide, to the location server, a report of the AoA measurements and their associated AEG identifiers. For example, the gNB may report AoA measurements and corresponding AEG identifiers. The reporting information may include AoA measurements and AEG identifiers for the UE or positioning SRS resources.

The above-described operations related to performing AoA measurements can include operations related to determining other measurements, such as reference signal received power (RSRP), time of arrival (ToA), Rx-Tx time difference, and/or the like. In addition, although the example signal diagram 200 was described in the context of a location server and the gNB or TRP, certain embodiments may also apply to the case between the UE and the LMF. For example, if NR includes side-link (SL) positioning, it the AoA between UEs may be measured and certain embodiments may apply to that case.

As indicated above, FIG. 2 is provided as an example. Other examples are possible, according to some embodiments.

As explained herein, certain embodiments may provide for AEG configuration and signaling. A gNB according to certain embodiments may have full flexibility on how to construct an AEG for a TRP. gNB or TRP implementation and/or the utilized measurement estimation algorithm may determine how AEGs are constructed. The gNB can provide a location server with information on how to determine the AEG listed below. Also, the LMF can request the gNB to determine an AEG in a particular manner. This information transmission may utilize NR positioning protocol A (NRPPa) and/or LTE positioning protocol A (LPPa). Various options may be used to determine an AEG. For example, the gNB can determine or use one or multiple AEGs for a UE, the gNB can determine or use one or multiple AEGs for a group of UEs, the gNB can determine or use one or multiple AEGs for a specific region or area (e.g., the gNB may be able to associate a specific cell portion identifier with one or multiple AEGs, the gNB can determine or use one or multiple AEGs for an SRS resource, the gNB can determine or use a specific AEG for a single received signal path, and/or the like. With respect to determining the AEGs for a specific region or area, the gNB can use the timing advance (TA) or the expected propagation delay to also determine the rough distance to the UE.

The gNB may determine the target UE's approximate location, and the gNB or LMF may determine the expected propagation delay from the NRPPa signaling. For example, the gNB may determine that some UEs are near the cell edge based on the received signal strength. According to the UE's location, the AEG configuration may be different. For UEs far from the TRP (e.g., greater than approximately 8 m), a single AEG for the TRP may be sufficient. Otherwise, multiple AEGs may have to be used for a UE proximate to the TRP (e.g., less than approximately 8 m) since the AoA value might not be the same over various antenna elements.

Different AEGs may be used for different signal paths if multiple signal paths exist based on diffraction, etc. The AEGs may be determined in such a way that it can be determined whether the error introduced by the far-field assumption is within a certain margin. That margin may be preconfigured (e.g., approximately 0.05 degrees) or may be configured by the LMF based on the particular positioning quality of service (QoS) for a UE.

Figure 3:
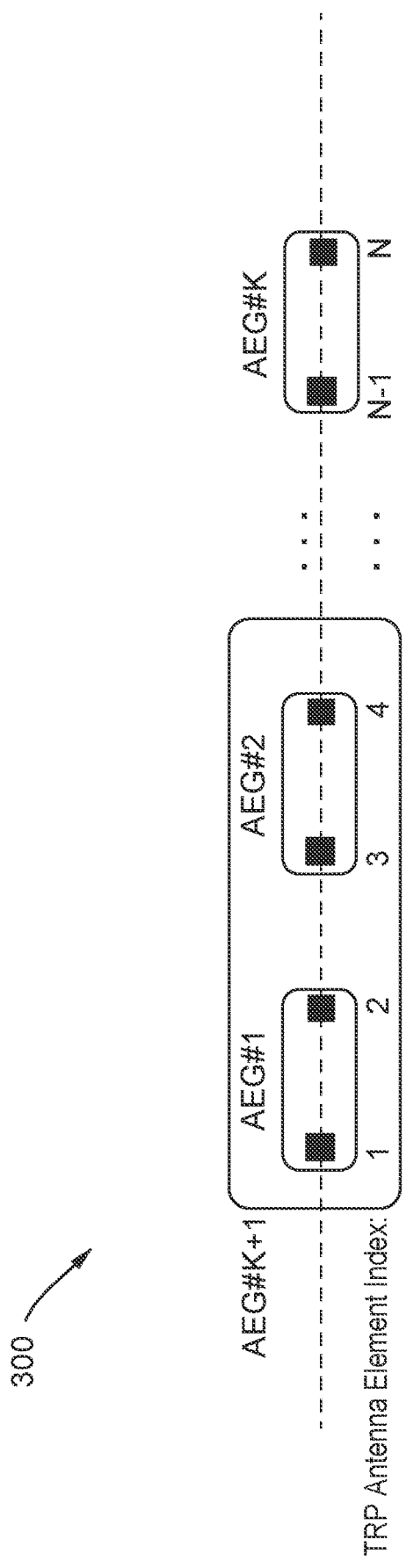
FIG. 3 illustrates an example of antennas (or antenna elements) of an AEG, according to some embodiments.

FIG. 3 illustrates an example 300 of antennas (or antenna elements) of an AEG, according to some embodiments. According to a decision by the network, between two different AEGs, the same antenna elements (or antennas) can be included, as shown in FIG. 3. For a UE highly close to a TRP (e.g., closer than 8 m), a single AEG may include fewer antenna elements (or antennas). In this case, certain embodiments may provide for simultaneous measurement operation between different AEGs for signals simultaneously transmitted by two different UEs.

In addition, a UE may also use AEG(s) to measure AoA(s) of transmitted signals from other UEs. For example, a vehicle may have multiple antennas and/or antenna panels depending on the configuration of the vehicle. For relative or absolute positioning between two different vehicles, wireless signals can be used. In this case, the UE can determine AEG(s) based on the area or region around itself. If a UE can estimate a target UE's relative or absolute location, a UE can determine or use one or multiple AEG(s) for each target UE, a UE can determine or use one or multiple AEG(s) for a group of target UE(s), or a UE can determine or use one or multiple AEG(s) for a specific region or area around itself. The UE can provide the location server (or LMF) with information on AEG(s) by using a positioning protocol (e.g., LTE positioning protocol (LPP)). In addition, the UE may provide the location server with geometric or physical antenna information. The location server can request the UE to provide the information on the antenna and/or AEG(s).

Figure 4:
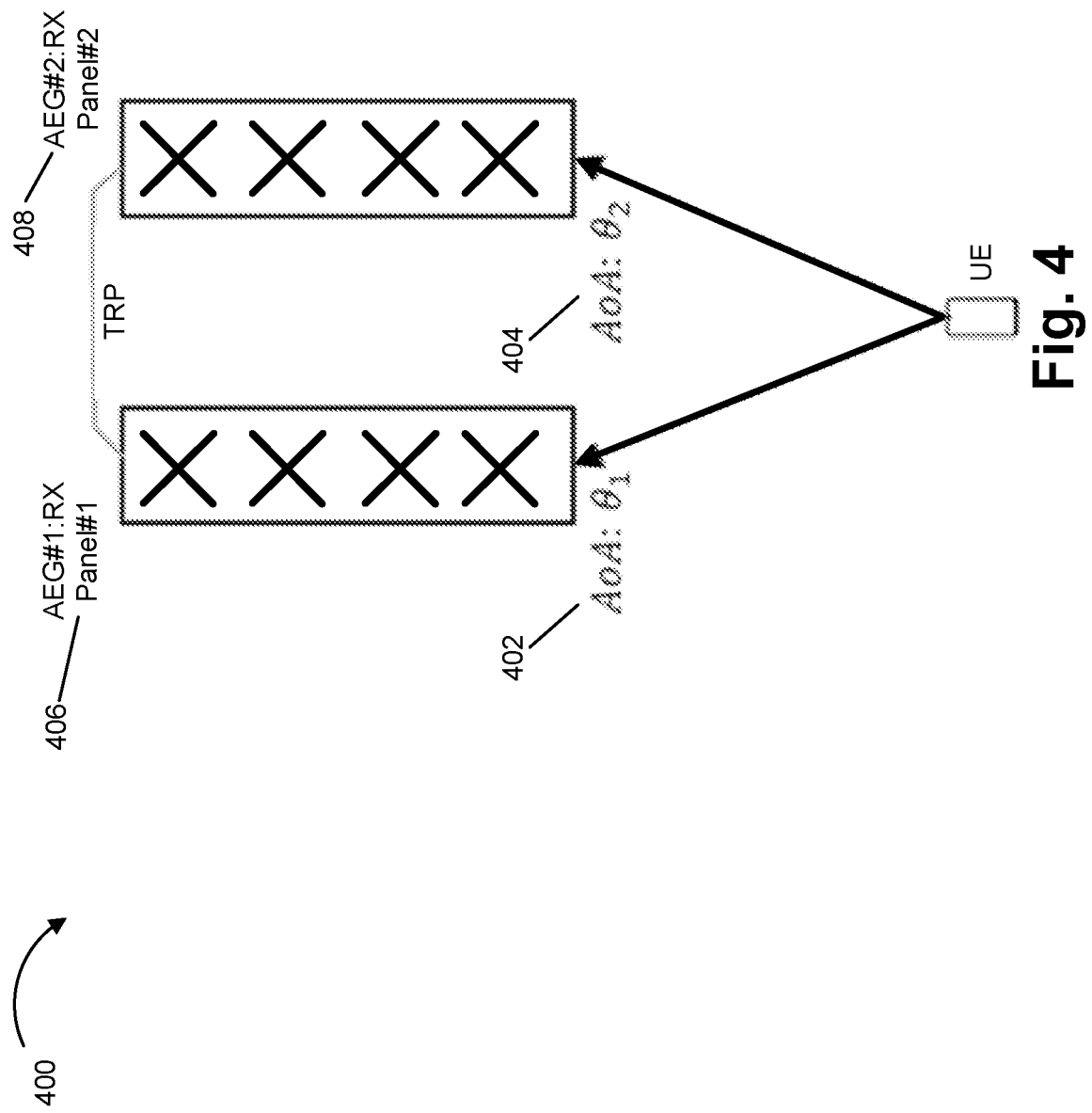
FIG. 4 illustrates an example of AoA measurements of a transmit receive point (TRP), according to some embodiments.

As explained herein, certain embodiments may provide for measurement reporting and use of multiple receive panels. Certain embodiments related to AEGs may not just apply to near-field and far-field waves. The AEG can be a single specific antenna element of a TRP or UE, or it can be one or multiple antenna panels. Thus, certain embodiments may provide for AoA measurement and reporting per AEG and thus, panel-wise measurement and reporting also can be provided by certain embodiments. FIG. 4 provides an example of this, where FIG. 4 illustrates an example 400 of AOA measurements of a TRP, according to some embodiments. FIG. 4 illustrates that a TRP may estimate AoA measurements for a receive panel when a UE transmits positioning SRS resources. Depending on the UE's location relative to the TRP, even if there is just LoS signal path, the TRP may obtain more than one AoA measurement (e.g., for the AoAs at 402 and 404). In the example 400, the TRP may determine $\theta_1$ and $\theta_2$ by using RX panel #1 and RX panel #2 at 406 and 408, respectively. As further illustrated in FIG. 4, RX panel #1 may be defined as AEG #1 and RX panel #2 may be defined as AEG #2, and the gNB may report the information (AEG #1, $\theta_1$) and (AEG #2, $\theta_2$) to the location server.

In this way, using AEGs may allow for flexible TRP antenna or panel implementation and may reduce or eliminate the need for providing information to the LMF. The TRP may just signal to the LMF an AEG identifier and an associated location. Similarly, certain embodiments of using AEGs may allow for flexible UE antenna or panel implementation (e.g., on a vehicle) and may reduce or eliminate the need to related information to the LMF.

A gNB may provide (AEG information, AoA) for a TRP rather than a specific RX panel and its corresponding AoA measurement of the TRP, if or when a location server (or LMF) requests reporting of the TRP's RX panel-specific AoA measurement from the gNB. A location server or LMF can request AoA measurement(s) for a TRP and their associated AEG information (e.g., AEG identifier). Then, the gNB may report one or multiple information sets (AoA measurement, AEG ID) to the location server. A location server or LMF can request AoA measurement reporting for a specific AEG identifier of a TRP from the gNB. For example, due to the interference problem described herein, the LMF may have to have AoA measurements which indicate a better quality than previously reported for an AEG identifier. In this case, the LMF may have to support the functionality so that the LMF requests the AoA for a specific AEG identifier.

As explained herein, certain embodiments may provide for antenna phase center information with AEG. An antenna phase center may include information used to accurately estimate a UE's location by using positioning measurement(s), such as timing and/or angle measurement(s) (e.g., AoA, AoD, ToA, or Rx-Tx time difference). For instance, it may be important to have a precise measure of the effective phase reference positioning for the signal received via the antenna array. However, the UE antenna array phase center may not always align with the physical antenna reference point and its location may be sensitive to several parameters that may vary during live operation in the field. Location server(s) according to certain embodiments may have to compensate measurement errors resulting from this problem. Depending on the AEG configuration, an independent antenna phase center offset may have to be considered for each AEG in order to compensate for the measurement. That is, depending on the AEG configuration, the same or different antenna phase centers can be considered for measurement compensation according to the antenna phase center offset. Therefore, according to certain embodiments, the gNB may include reporting of an AEG-specific offset value to the location server to compensate for measurement error resulting from antenna phase center error. For example, the gNB may report one or multiple information sets (AoA value, AEG identifier, offset) for a TRP. The location server may request the inclusion of an offset value with the reporting of AoA and AEG information from the gNB. The gNB's reporting and request of the location server can utilize NRPPa. In addition, certain embodiments may provide AoA measurements from the TRP or gNB side, but may be extended to AoA measurements from the UE side.

In an example involving a vehicle, the number of antenna elements may have to be sufficient to perform AoA measurement. Accordingly, certain embodiments may provide for a UE to include reporting of an AEG-specific offset value to the location server to compensate for measurement error resulting from antenna phase center error. For example, the UE may report one or multiple information sets (AoA value, AEG identifier, offset). The location server may request the inclusion of the offset value with the reporting of AoA and AEG information to the UE.

Figure 5:
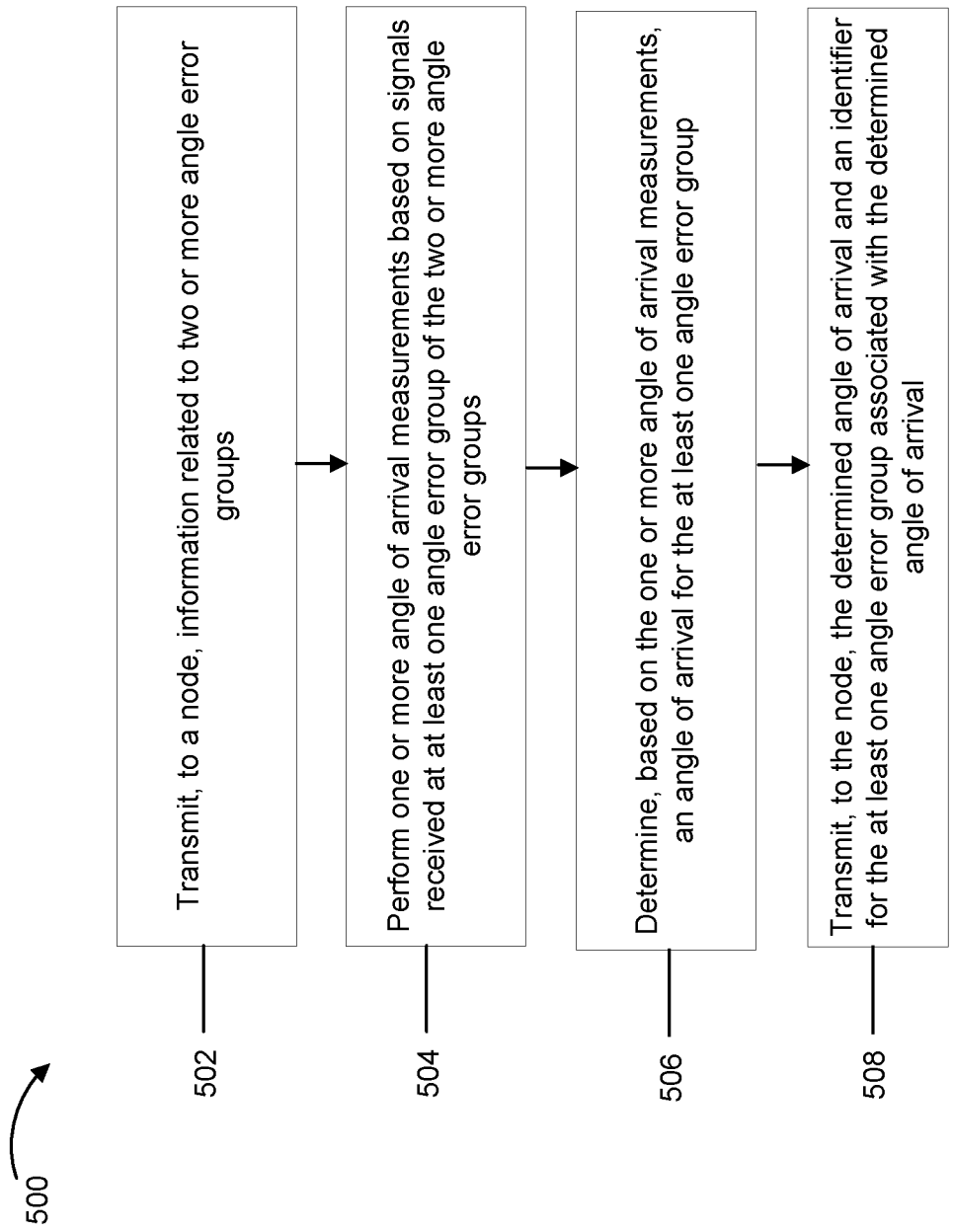
FIG. 5 illustrates an example flow diagram of a method, according to some embodiments.

FIG. 5 illustrates an example flow diagram of a method 500, according to some embodiments. For example, FIG. 5 may illustrate example operations of a network node (e.g., apparatus 10 illustrated in, and described with respect to, FIG. 7a). In an embodiment, FIG. 5 may illustrate example operations of a gNB or a TRP (e.g., of FIG. 2). In some embodiments, the device performing the method 600 may be a UE (e.g., apparatus 20 illustrated in, and described with respect to, FIG. 7b). Some of the operations illustrated in FIG. 5 may be similar to some operations shown in, and described with respect to, FIGS. 1-4.

In an embodiment, the method 500 may include, at 502, transmitting, to a node, information related to two or more angle error groups, e.g., in a manner similar to that at 208 of FIG. 2. The two or more angle error groups may include one or more antenna elements. The information may include identifiers for the two or more angle error groups. The method 500 may include, at 504, performing one or more angle of arrival measurements based on signals received at at least one angle error group of the two or more angle error groups, e.g., in a manner similar to that at 212 of FIG. 2. The method 500 may include, at 506, determining, based on the one or more angle of arrival measurements, an angle of arrival for the at least one angle error group, e.g., in a manner similar to that at 212 of FIG. 2. The method 500 may include, at 508, transmitting, to the node, the determined angle of arrival and an identifier for the at least one angle error group associated with the determined angle of arrival, e.g., in a manner similar to that at 216 of FIG. 2. In some embodiments, for an AoA measurement, the AoA measurement, the identifier for the angle error group, an identifier for a user equipment, an identifier for the SRS resource, and a UE's panel identifier may be transmitted at 506.

The method 500 illustrated in FIG. 5 may include one or more additional aspects described below or elsewhere herein. In some embodiments, the one or more angle of arrival measurements may include one or more horizontal angle of arrival measurements (e.g., azimuth) or one or more vertical angle of arrival measurements (e.g., elevation). In some embodiments, the transmitting at 508 may include transmitting the determined angle of arrival and the identifier for the at least one angle error group to at least one of a location server, a location management function node, or another user equipment. In some embodiments, the method 500 may further include transmitting, in connection with transmitting the determined angle of arrival and the identifier for the at least one angle error group at least one of: an identifier for the user equipment, a sounding reference signal resource identifier, multiple sounding reference signal resources identifiers, a sounding reference signal resource set identifier, an uplink random access channel preamble identifier, antenna panel information for the user equipment, or side-link reference signals (e.g., side-link reference signals for positioning). For example, a UE may use a specific transmission antenna panel, and the angle of arrival measured by the TRP may be different depending on the UE's antenna panel. The UE may transmit multiple SRS resources and the and the angle of arrival measured by the TRP can be different since each SRS resource can be associated with a different Tx beam direction (or different Tx panel). Similarly, for PRACH, each PRACH preamble can be associated with a synchronization signal block (SSB) where each SSB may be transmitted with a different Tx beam direction. In this case the UE may use a different beam to receive each SSB, and the UE may use the same beam direction to transmit a PRACH associated with the SSB. Since the AoA measurement can be different according to the transmission beam direction of the UE, this information can be useful. In some embodiments, the method 500 may include receiving a request for an indication of a capability of the apparatus related to determining angle error groups or angle of arrival positioning, e.g., in a manner similar to that at 202 of FIG. 2. In some embodiments, the method 500 may further include transmitting the indication, e.g., in a manner similar to that at 206 of FIG. 2.

In some embodiments, the method 500 may further include receiving an indication to report the determined angle of arrival for the at least one angle error group, e.g., in a manner similar to that at 214 of FIG. 2. In some embodiments, the transmitting at 508 may include transmitting the determined angle of arrival for the at least one angle error group and the identifier for the at least one angle error group based on the received indication. In some embodiments, the method 500 may further include receiving an error margin (which may depend on quality of service (QoS) parameters) related to the one or more angle of arrival measurements, and selecting the at least one angle error group based on the error margin. In some embodiments, the node may include at least one of a location calculation node, which may comprise a LMF, a location server, or a UE.

As described above, FIG. 5 is provided as an example. Other examples are possible according to some embodiments.

Figure 6:
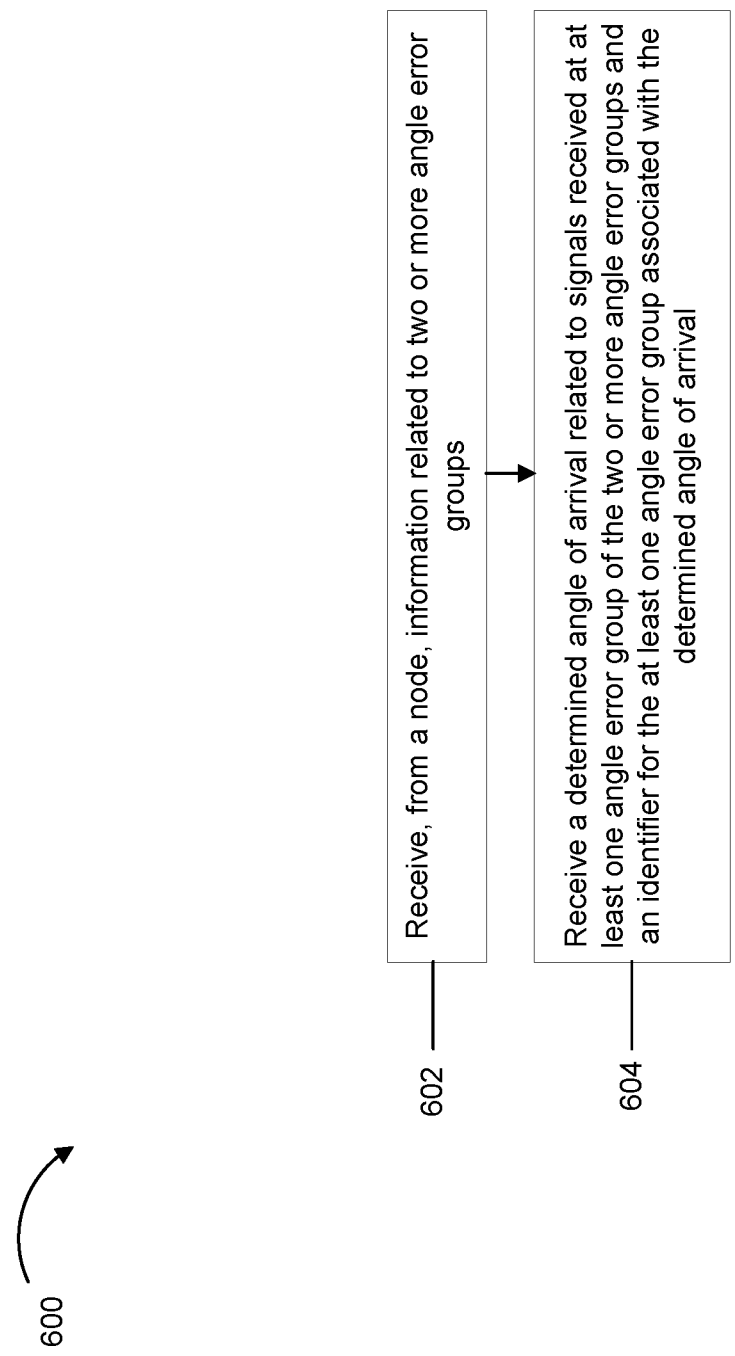
FIG. 6 illustrates an example flow diagram of a method, according to some embodiments.

FIG. 6 illustrates an example flow diagram of a method 600, according to some embodiments. For example, FIG. 6 may illustrate example operations of a network node (e.g., apparatus 10 illustrated in, and described with respect to, FIG. 7a). In an embodiment, FIG. 6 may illustrate example operations of a location server or a LMF (e.g., of FIG. 2). In some embodiments, the method 600 may be performed by a user equipment (e.g., apparatus 20 in FIG. 7b). Some of the operations illustrated in FIG. 6 may be similar to some operations shown in, and described with respect to, FIGS. 1-4.

In an embodiment, the method may include, at 602, receiving, from a node, information related to two or more angle error groups, e.g., in a manner similar to that at 208 of FIG. 2. The two or more angle error groups may include one or more antenna elements. The information may include identifiers for the two or more angle error groups. The method 600 may include, at 604, receiving a determined angle of arrival related to signals received at at least one angle error group of the two or more angle error groups and an identifier for the at least one angle error group associated with the determined angle of arrival, e.g., in a manner similar to that at 216 of FIG. 2.

The method illustrated in FIG. 6 may include one or more additional aspects described below or elsewhere herein. In some embodiments, the determined angle of arrival may be based on one or more angle of arrival measurements which may include one or more horizontal angle of arrival measurements or one or more vertical angle of arrival measurements. In some embodiments, the node may include at least one of a next generation node B, a transmit receive point, or the user equipment. In some embodiments, the method 600 may further include receiving, in connection with receiving the determined angle of arrival and the identifier for the at least one angle error group, at least one of: an identifier for the user equipment, a sounding reference signal resource identifier, multiple sounding reference signal resources identifiers, a sounding reference signal resource set identifier, an uplink random access channel preamble identifier, antenna panel information for the user equipment, or side-link reference signals (e.g., side-link reference signals for positioning). In some embodiments, the method 600 may further include transmitting a request for an indication of a capability of the node related to determining angle error groups or angle of arrival positioning, e.g., in a manner similar to that at 202 of FIG. 2. In some embodiments, the method 600 may further include receiving the indication, e.g., in a manner similar to that at 206 of FIG. 2.

In some embodiments, the method 600 may further include transmitting an indication to report the determined angle of arrival for the at least one angle error group, e.g., in a manner similar to that at 214 of FIG. 2. In some embodiments, the method 600 may further include receiving the determined angle of arrival for the at least one angle error group and the identifier for the at least one angle error group based on the transmitted indication. In some embodiments, the method 600 may include transmitting an error margin related to the one or more angle of arrival measurements. In some embodiments, the method 600 may further include estimating a location of the user equipment based on the determined angle of arrival, and the identifier for the at least one angle error group.

As described above, FIG. 6 is provided as an example. Other examples are possible according to some embodiments.

FIG. 7a illustrates an example of an apparatus 10 according to an embodiment. In an embodiment, apparatus 10 may be a node, host, or server in a communications network or serving such a network. For example, apparatus 10 may be a network node, location server, LMF, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-6. For instance, apparatus 10 may be controlled by memory 14 and processor 12 to perform the method of FIGS. 5 and 6.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-6. For instance, in one embodiment, apparatus 20 may be controlled by memory 24 and processor 22 to perform the method] of FIG. 5.

In some embodiments, an apparatus (e.g., apparatus 10 and/or apparatus 20) may include means for performing a method or any of the variants discussed herein, e.g., a method described with reference to FIGS. 5 r 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is accuracy performance improvement for AoA positioning (e.g., for when target UEs are close to the TRP or gNB). Another benefit of some example embodiments is accuracy improvement for AoA positioning for vehicle-to-everything (V2X) localization. Further, another benefit of some example embodiments is flexible antenna or panel implementation and removal of the need to disclose too many details to the LMF through use of AEGs (e.g., the TRP may inform the LMF with AEG identifiers and associated location. Accordingly, the use of some example embodiments results in improved functioning of communications networks and their nodes and, therefore constitute an improvement at least to the technological field of UE positioning, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

PRS Positioning Reference Signal
gNB 5G Base Station
LOS Line of Sight
NR New Radio (5G)
RS Reference Signal
RSRP Reference Signal Received Power
Rx Receive/Receiver
Tx Transmit/Transmitter
Rx-Tx Receive-Transmit
SRS Sounding Reference Signal
AoA Angle of Arrival
ToA Time of Arrival
TDoA Time Difference of Arrival
AoD Angle of Departure
UE User Equipment
UL Uplink
LMF Location Management Function
NRPPa NR Positioning Protocol A
LPPa LTE Positioning Protocol A

We claim:

1. An apparatus, comprising:
at least one processor; and
at least one memory including computer program code,
wherein the at least one memory and the computer program code are configured to, with the at least one processor, cause the apparatus at least to:
transmit, to a node, information related to two or more angle error groups, wherein the two or more angle error groups comprise one or more antenna elements, wherein the information comprises identifiers for the two or more angle error groups;
perform one or more angle of arrival measurements based on signals received at at least one angle error group of the two or more angle error groups;
determine, based on the one or more angle of arrival measurements, an angle of arrival for the at least one angle error group; and
transmit, to the node, the determined angle of arrival and an identifier for the at least one angle error group associated with the determined angle of arrival for determination of a user equipment location.

2. The apparatus according to claim 1, wherein the one or more angle of arrival measurements comprise one or more horizontal angle of arrival measurements, or one or more vertical angle of arrival measurements.

3. The apparatus according to claim 1, wherein the at least one memory and the computer program code are configured to, with the at least one processor, further cause the apparatus, when transmitting the determined angle of arrival and the identifier for the at least one angle error group, at least to:
transmit the determined angle of arrival and the identifier for the at least one angle error group to at least one of a location server, a location management function node, or a user equipment.

4. The apparatus according to claim 1, wherein the at least one memory and the computer program code are configured to, with the at least one processor, further cause the apparatus at least to:
transmit, in connection with transmitting the determined angle of arrival and the identifier for the at least one angle error group, at least one of:
an identifier for a user equipment,
a sounding reference signal resource identifier,
multiple sounding reference signal resources identifiers,
a sounding reference signal resource set identifier,
an uplink random access channel preamble identifier,
antenna panel information for the user equipment, or
side-link reference signals.

5. The apparatus according to claim 1, wherein the at least one memory and the computer program code are configured to, with the at least one processor, further cause the apparatus at least to:
receive a request for an indication of a capability of the apparatus related to determining angle error groups or angle of arrival positioning; and
transmit the indication.

6. The apparatus according to claim 1, wherein the at least one memory and the computer program code are configured to, with the at least one processor, further cause the apparatus at least to:
receive an indication to report the determined angle of arrival for the at least one angle error group.

7. The apparatus according to claim 6, wherein the at least one memory and the computer program code are configured to, with the at least one processor, further cause the apparatus, when transmitting the determined angle of arrival and the identifier for the at least one angle error group, at least to:
transmit the determined angle of arrival for the at least one angle error group and the identifier for the at least one angle error group based on the received indication.

8. The apparatus according to claim 1, wherein the at least one memory and the computer program code are configured to, with the at least one processor, further cause the apparatus at least to:
receive an error margin related to the one or more angle of arrival measurements, wherein the error margin is dependent on a measurement quality or an accuracy requirement; and
select the at least one angle error group based on the error margin.

9. The apparatus according to claim 1, wherein the apparatus comprises at least one of a next generation node B, a transmit receive point, or a user equipment.

10. The apparatus according to claim 1, wherein the two or more angle error groups are defined based on a distance between the user equipment and the apparatus.

11. An apparatus, comprising:
at least one processor; and
at least one memory including computer program code,
wherein the at least one memory and the computer program code are configured to, with the at least one processor, cause the apparatus at least to:
receive, from a node, information related to two or more angle error groups, wherein the two or more angle error groups comprise one or more antenna elements, wherein the information comprises identifiers for the two or more angle error groups; and
receive a determined angle of arrival related to signals received at at least one angle error group of the two or more angle error groups and an identifier for the at least one angle error group associated with the determined angle of arrival; and estimate a user equipment location based on the determined angle of arrival and the identifier.

12. The apparatus according to claim 11, wherein the determined angle of arrival is based on one or more angle of arrival measurements comprising one or more horizontal angle of arrival measurements or one or more vertical angle of arrival measurements.

13. The apparatus according to claim 11, wherein the node comprises at least one of a next generation node B, a transmit receive point, or a user equipment.

14. The apparatus according to claim 11, wherein the at least one memory and the computer program code are configured to, with the at least one processor, further cause the apparatus at least to:

receive, in connection with receiving the determined angle of arrival and the identifier for the at least one angle error group, at least one of:
an identifier for a user equipment,
a sounding reference signal resource identifier,
multiple sounding reference signal resources identifiers,
a sounding reference signal resource set identifier,
an uplink random access channel preamble identifier,
antenna panel information for the user equipment, or
side-link reference signals.

15. The apparatus according to claim 11, wherein the at least one memory and the computer program code are configured to, with the at least one processor, further cause the apparatus at least to:

transmit a request for an indication of a capability of the node related to determining angle error groups or angle of arrival positioning; and
receive the indication.

16. The apparatus according to claim 11, wherein the at least one memory and the computer program code are configured to, with the at least one processor, further cause the apparatus at least to:

transmit an indication to report the determined angle of arrival for the at least one angle error group.

17. The apparatus according to claim 16, wherein the at least one memory and the computer program code are configured to, with the at least one processor, further cause the apparatus, when receiving the determined angle of arrival and the identifier for the at least one angle error group, at least to:

receive the determined angle of arrival for the at least one angle error group and the identifier for the at least one angle error group based on the transmitted indication.

18. The apparatus according to claim 11, wherein the at least one memory and the computer program code are configured to, with the at least one processor, further cause the apparatus at least to:

transmit an error margin related to the one or more angle of arrival measurements, wherein the error margin is dependent on a measurement quality or an accuracy requirement.

19. The apparatus according to claim 11, wherein the apparatus comprises at least one of a location server, a location management function node, or a user equipment.

20. The apparatus according to claim 11, wherein the at least one memory and the computer program code are configured to, with the at least one processor, further cause the apparatus at least to:

estimate a location of a user equipment based on the determined angle of arrival and the identifier for the at least one angle error group.

21. The apparatus according to claim 11, wherein the two or more angle error groups are defined based on a distance between the user equipment and the node.

22. A method, comprising:

transmitting, by a node to another node, information related to two or more angle error groups, wherein the two or more angle error groups comprise one or more antenna elements, wherein the information comprises identifiers for the two or more angle error groups;

performing one or more angle of arrival measurements based on signals received at at least one angle error group of the two or more angle error groups;

determining, based on the one or more angle of arrival measurements, an angle of arrival for the at least one angle error group; and transmitting, to the other node, the determined angle of arrival and an identifier for the at least one angle error group associated with the determined angle of arrival for determination of a user equipment location.

23. The method according to claim 22, wherein the two or more angle error groups are defined based on a distance between the user equipment and the node.

* * * * *